United States Patent
Hamm et al.

[19]

[11] Patent Number: 6,121,875
[45] Date of Patent: Sep. 19, 2000

[54] MONITORING AND ALERTING SYSTEM FOR BUILDINGS

[75] Inventors: Dennis Hamm; David P. Kimmich, both of Pasadena, Calif.

[73] Assignee: Inform 2000, Pasadena, Calif.

[21] Appl. No.: 09/107,181

[22] Filed: Jun. 29, 1998

Related U.S. Application Data

[63] Continuation-in-part of application No. 08/598,338, Feb. 8, 1996, Pat. No. 5,774,052
[60] Provisional application No. 60/089,421, May 16, 1998.

[51] Int. Cl.[7] ............................................. G08B 21/00
[52] U.S. Cl. ................................. 340/540; 250/214 AL
[58] Field of Search ................................. 340/540, 641, 340/583; 250/214 AL, 200, 208.4, 214 D, 214 LS

[56] References Cited

U.S. PATENT DOCUMENTS

| | | | |
|---|---|---|---|
| 4,198,563 | 4/1980 | Elssner | 250/214 AL |
| 4,233,545 | 11/1980 | Webster et al. | 250/214 AL |
| 4,237,377 | 12/1980 | Sansum | 250/214 AL |
| 4,847,483 | 7/1989 | Nishibe et al. | 250/214 AL |
| 5,017,794 | 5/1991 | Linwood et al. | 250/214 AL |
| 5,019,747 | 5/1991 | Morita et al. | 250/214 AL |
| 5,144,661 | 9/1992 | Shamosh et al. | 340/540 |
| 5,825,019 | 10/1998 | Birrell | 250/214 AL |

*Primary Examiner*—Jeffery A. Hofsass
*Assistant Examiner*—John Tweel, Jr.
*Attorney, Agent, or Firm*—John E. Wagner

[57] ABSTRACT

A system is disclosed for sensing selected conditions particularly adjacent to an unoccupied commercial business building and taking the appropriate action. Corrective action may include shutting down a system, sending a signal to an occupied location for evaluation of the selected abnormal condition, or making a record of the abnormal condition for rectification at a later time. The system includes one or more light level sensors including microcomputer controlled photocell units directed to observe the light level at selected locations and to transmit signals indicating sensed light values below a desired value, and includes a receiver receiving the transmitted signals and which responds to such signals to produce a correction signal. If the commercial establishment is a bank and the light level is at an ATM (automatic teller machine) the system may respond to the correction signal by temporarily shutting the ATM machine down and illuminating a sign to indicate that the ATM is not open. If the condition sensed is a different type of discrepancy, failure of heating, water leak detection or other emergency, the system includes a modem and telephone communications link to a human monitoring station for instantaneous alerting and to allow corrective action.

17 Claims, 9 Drawing Sheets

1

MONITORING AND ALERTING SYSTEM FOR BUILDINGS

REFERENCE TO RELATED APPLICATION(S)

This application is a continuation-in-part of patent application Ser. No. 08/598,338 filed Feb. 8, 1996, now U.S. Pat. No. 5,774,052.

The day/night sensor disclosed herein is the subject of co-pending provisional patent application Ser. No. 60/089,421, filed May 16, 1998.

BRIEF SUMMARY OF THE INVENTION

In the banking business, there has been great expansion of the use of ATM and credit card transactions in place of conventional printed checks. The branch bank has become a satellite facility for the central or main branch and must attempt to be a full service banking facility even though it may have only a small number of employees. The branch bank itself often is a freestanding building or end section of a shopping center or strip mall. It is intended to provide full banking services and to be self sufficient from the facilities and security standpoint. It may rely upon wired security signaling to a local police department or security company. The facility is not usually occupied during the nighttime hours.

The ATM installation has added round the clock service to customers in allowing them to make deposits or withdrawals at any time of the day or night.

The expansion of the ATM has given rise to a new type of crime in which a criminal observes a likely victim at an ATM machine and through brute force or by observing and recording the personal identification number (PIN) of the user can gain access to the person's account. The installation of ATMs at branch banks and remote locations has given rise to municipal and statewide requirements that the banking facility provide adequate lighting around such machines to deter would-be criminals and protect nighttime users of the machines. Continuous monitoring of light levels at the ATM installation and its environs is therefore essential.

We have determined that once ATM lighting level is monitored at a central location, either within the branch bank or at a monitoring manned location away from the bank branch, other services may be monitored and controlled, as well, for more efficient operation of the branch. Examples of such other services which can be provided with the lighting alert system are:

a. A remote programmable time clock used to control all lights, signage, heating and air conditioning;
   b. business machine unauthorized removal detection;
   c. panic alarms for employees, in the bank or parking lot;
   d. panic alarms for couriers (during off hours);
   e. water leak detection;
   f. detection of heating/air conditioning system failure; and
   g. scheduled preventive maintenance for any systems.

The system which can provide all of these services comprises, basically:

1. a series of sensors for each environmental or other factor to be monitored;
2. a sensor signal data collection system, wired, optical or RF or a combination of such data collectors;
3. a data processing unit including stored programs and schedules as well as fault signal analysis processing to distinguish real from false alarms and incipient failures; and
4. an alerting system either local or at a distant monitoring system or both.

These functions are accomplished including light alert sensors and their associated control system. Additionally, a day/night sensor insures proper operation during nighttime hours and is immune to system errors due to such factors as cloudy days, extraneous light, photocell aging or accumulated contamination on either light sources or light sensors.

BRIEF DESCRIPTION OF THE DRAWING(S)

This invention may be more clearly understood with the following detailed description and by reference to the drawings in which.

Figure 5:
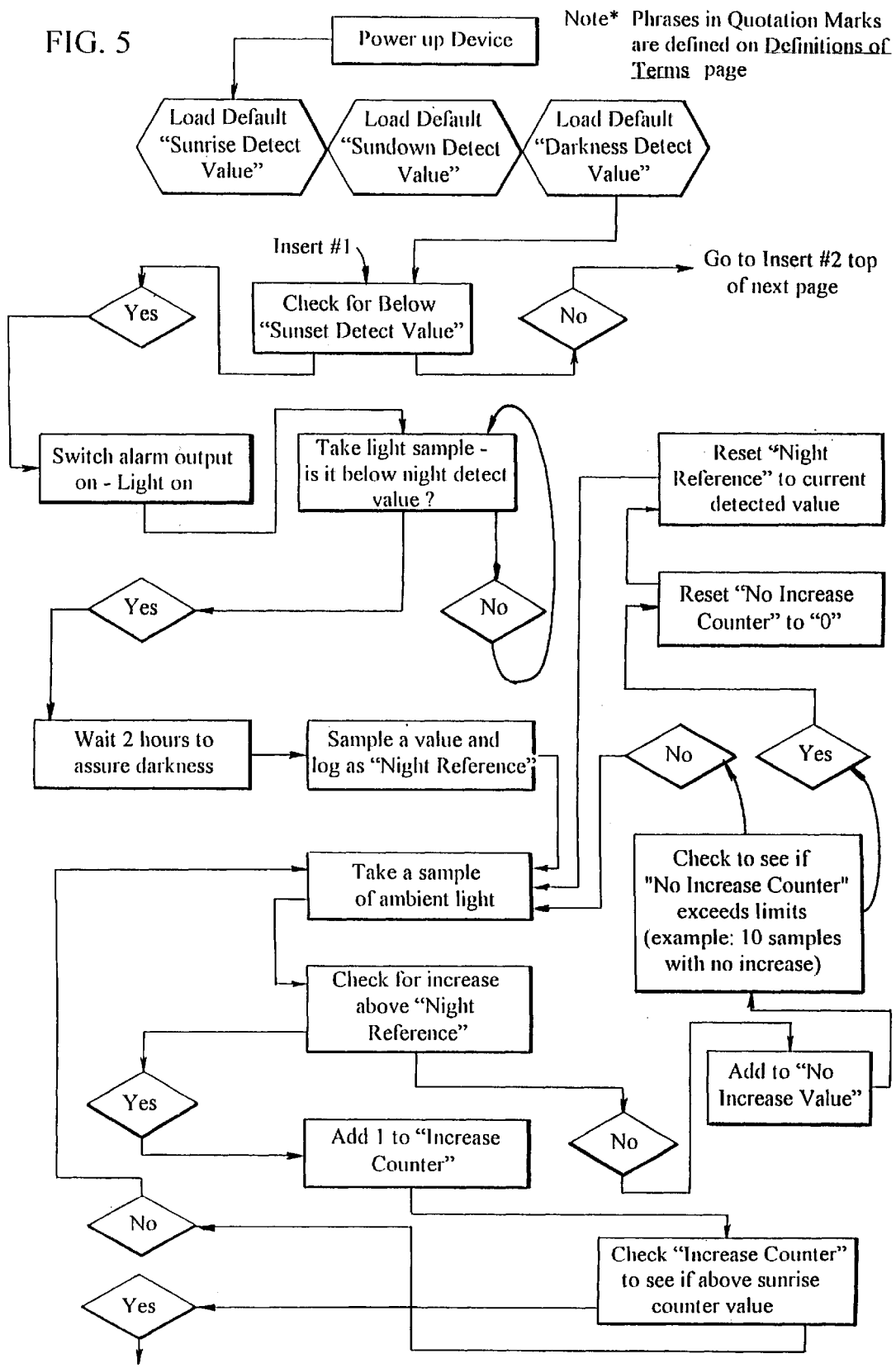
Figure 5A:
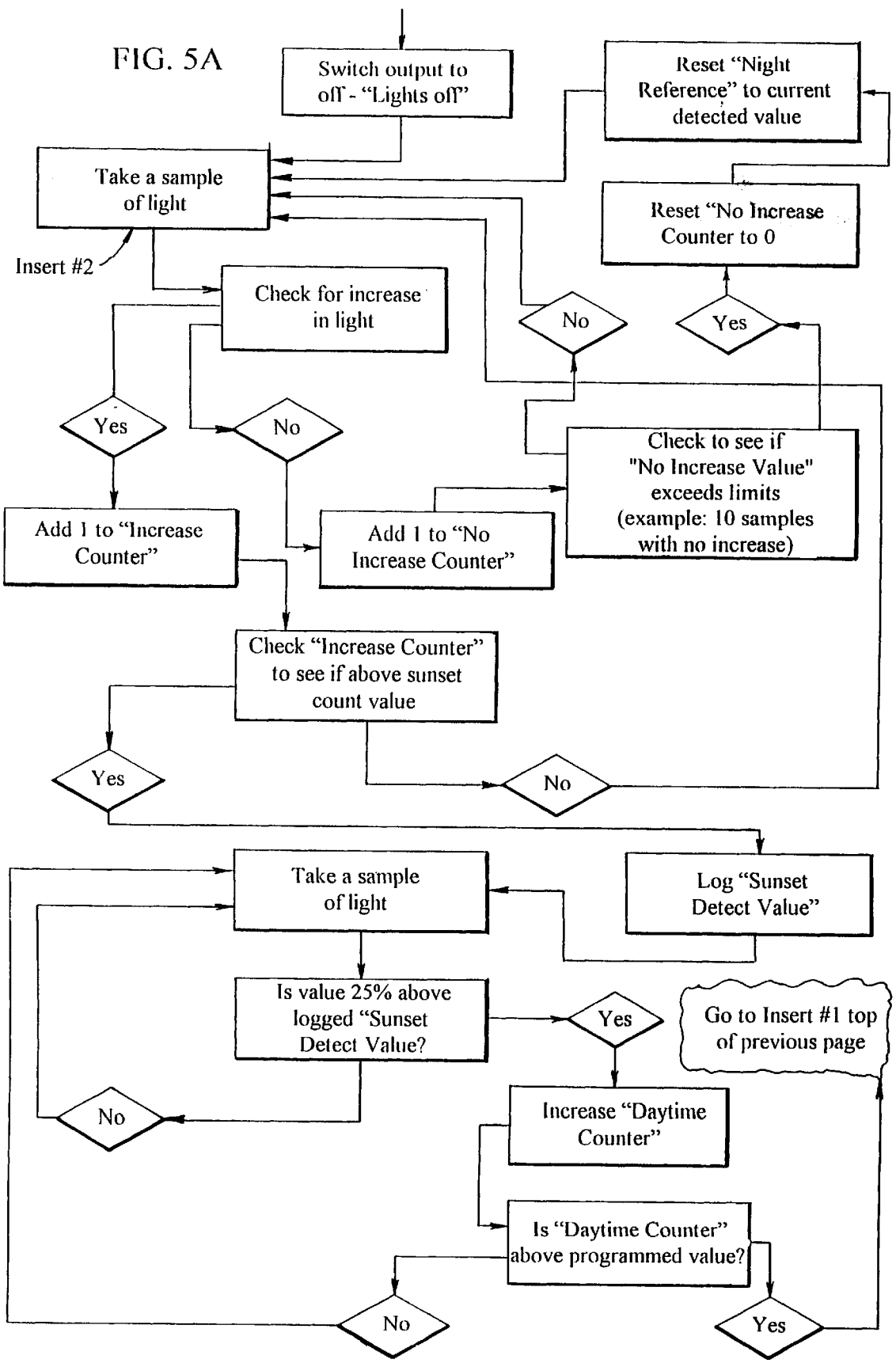
Figure 6:
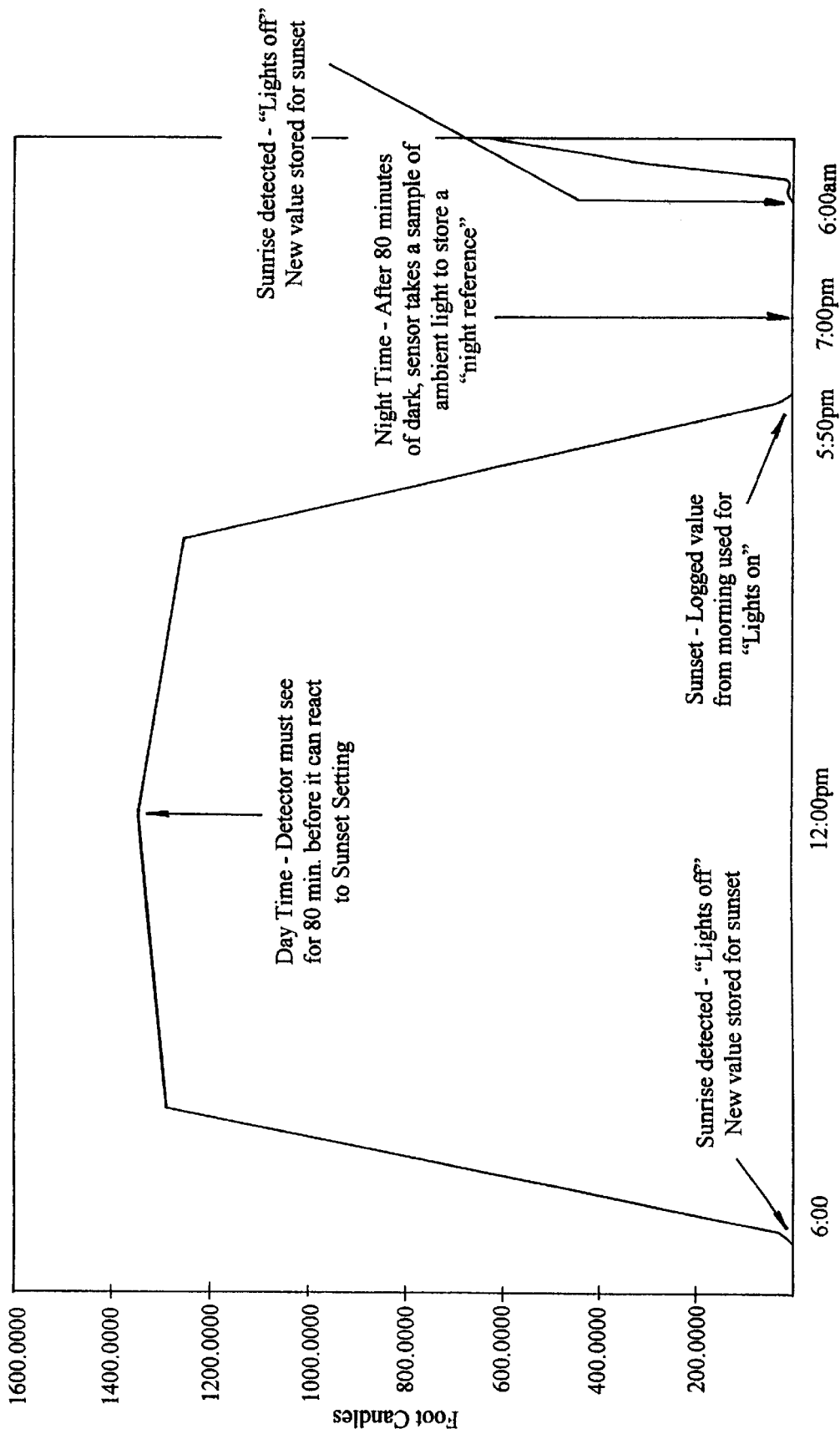

FIGS. 5 and 5A constitute a flowchart which describes the operation of a day/night sensor constituting part of the overall system of this invention;

FIG. 6 is a curve plotting foot-candles vs. time through a typical day; and

Figure 7:
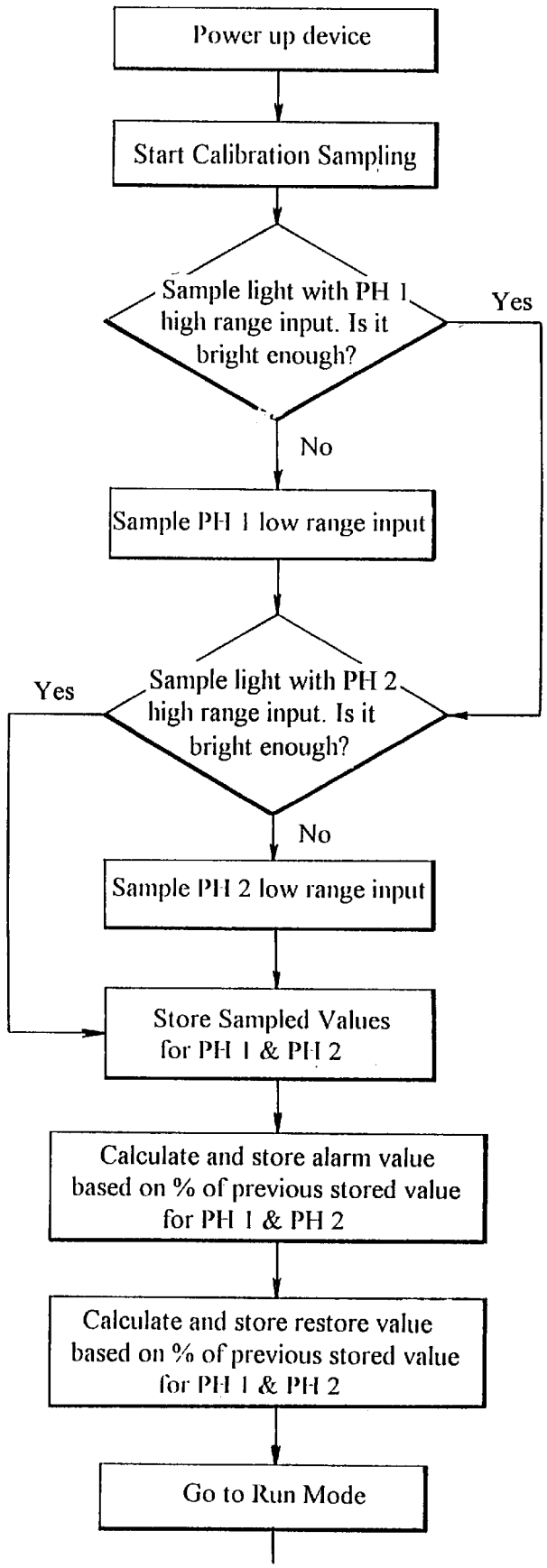
Figure 7A:
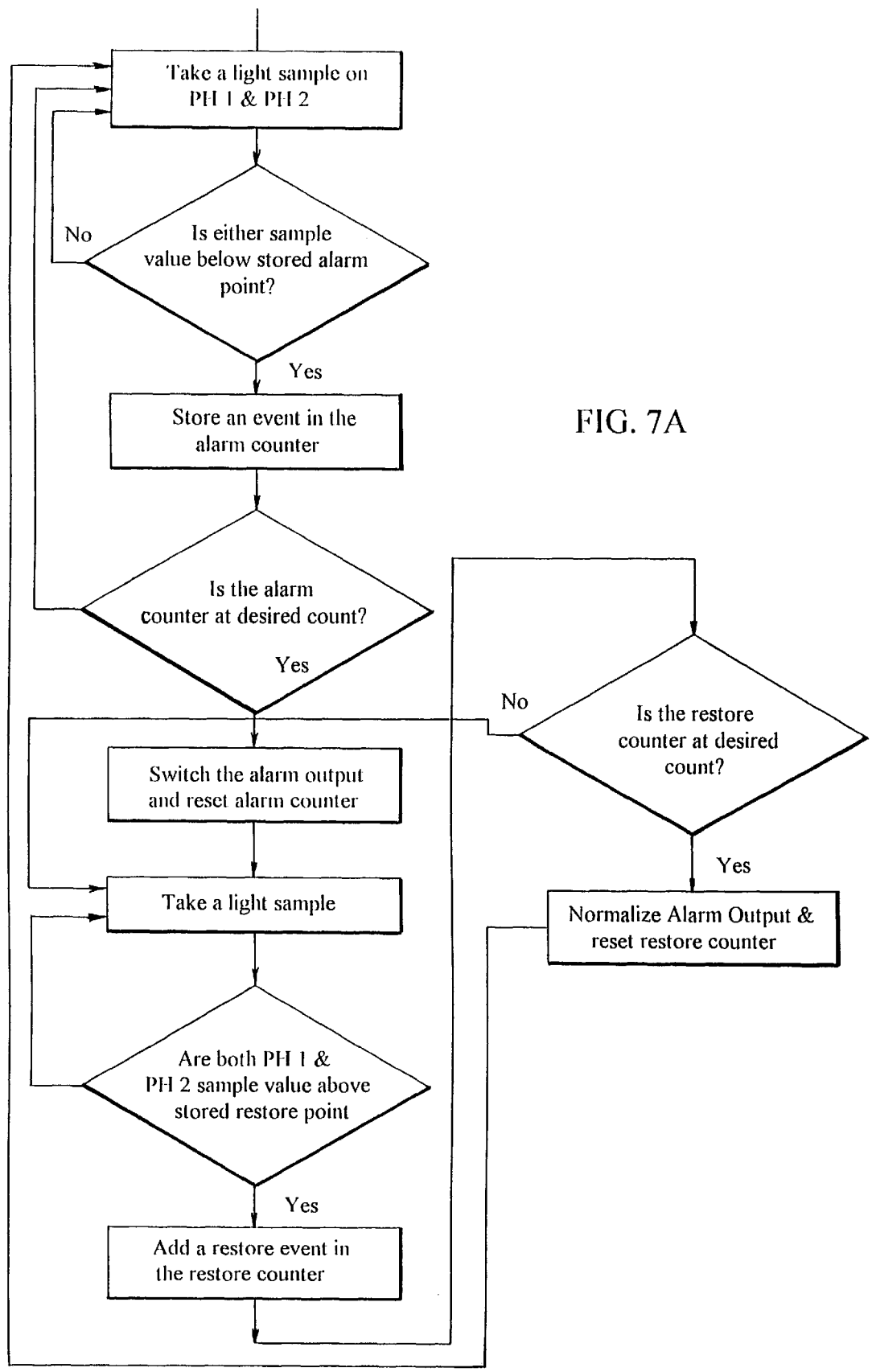

FIGS. 7 and 7A constitute a flowchart which describes the operation of the microcomputer controlled photocell.

DETAILED DESCRIPTION OF THE PREFERRED EMBODIMENT

There is a need for an integrated facility management system for single or satellite locations including light level monitoring and alarm. Once having the capability of real time sensing of light levels and for control of an ATM installation and warning of customers has been accomplished, expansion of the system is possible. An example of such a system is disclosed below.

The System

Now referring to the drawing FIGS. 1, 2 and 3, a typical installation of a commercial building employing this invention, namely a branch bank building 10 and parking lot 11 with an external walkup Automatic Teller Machine, hereinafter ATM 12. As in a typical branch bank situation, the branch bank building 10 is free standing as in FIG. 1 or may be semi attached in a shopping mall or commercial strip center. The branch bank building 10 will have a parking lot 11 and sometimes a drive through route with either a live teller window or a second ATM installation operated by a driver/customer while in their vehicle.

In this case, a branch bank with a parking lot 11 is depicted with a single walkup ATM 12 shown. The same principle of this invention may be applied to other branch bank arrangements or to other commercial facilities or businesses. The criteria for selection of the installation is that the business has any of the needs set forth above including customer's security lighting and the need to monitor and optimize energy consumption of the various occupancy-related systems such as heat/air conditioning and to detect and report abnormal conditions.

Figure 1:
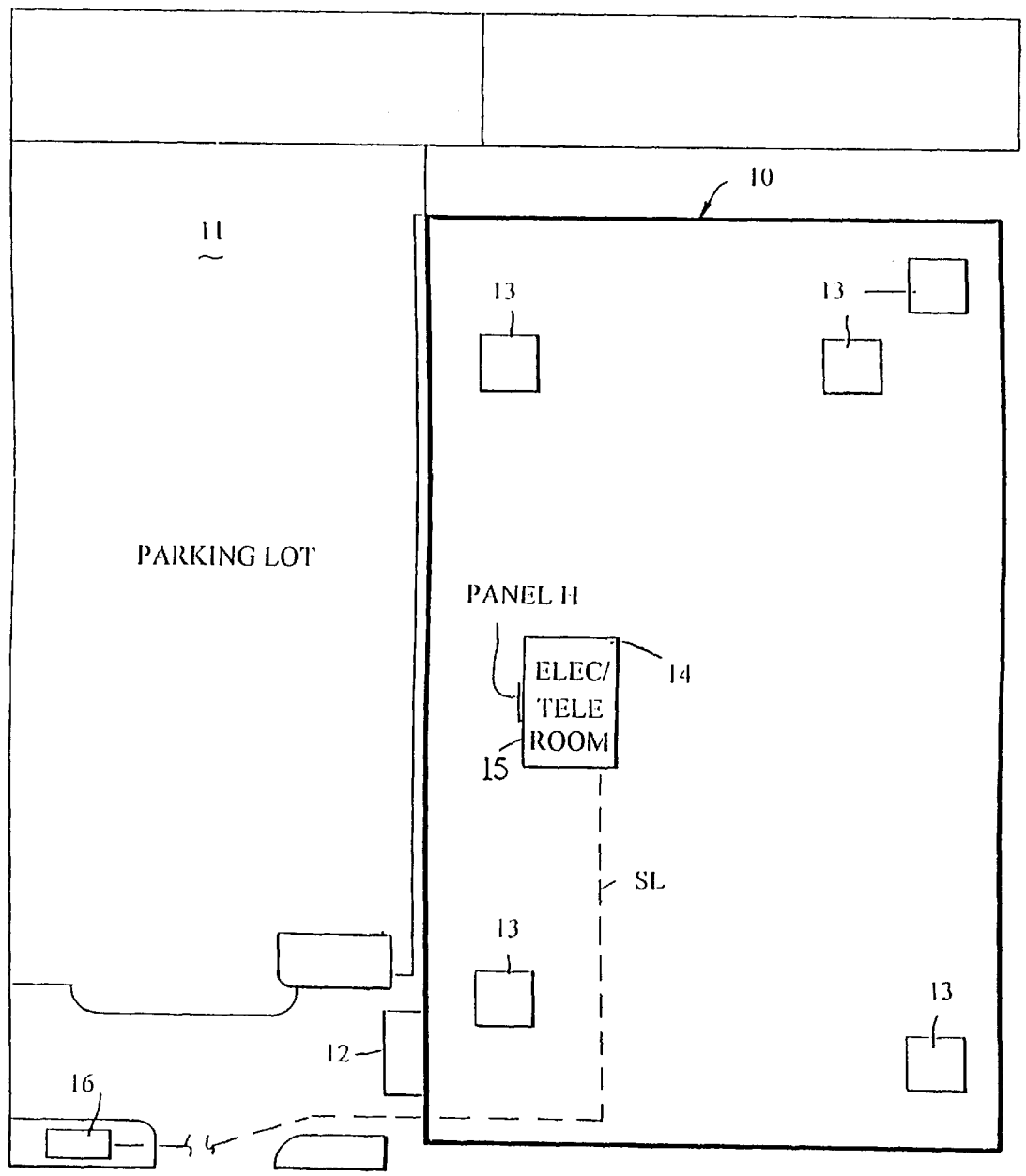
FIG. 1 is a layout of a typical commercial banking facility employing this invention.

Typically, any such installation has an equipment center such as electrical/telephone room 14 of FIG. 1. This is the central location where, typically, telephone and data service is received and distributed within the building 10. Power controls are often located in the same or nearby room. Heating and air conditioning is commonly supplied by a single large Heating, Ventilating, Air Conditioning (HVAC) system as shown in FIG. 1 by a number of individual units 13 located where needed and each having individual thermostats 33 or sensors 32 (FIG. 2) for zone control of heating and cooling. Each may have separate gas lines but electrical supply for such units will often be from the electrical/telephone room 14. An electrical panel 15 is usually located outside of the room 14 so that occupants of the building may reset circuit breakers as needed, without gaining access to the full electrical system.

Recent requirements such as California AB 224 have specified minimum light levels for external ATM installations and require the businesses to provide a well lighted area at the ATM 12 and in the adjacent approach paths for customer protection. Since most branch banks and commercial retail buildings are not occupied throughout each 24-hour period, a lighting failure may not be detected when it occurs and may be discovered only by periodic inspections. Twenty-four hour usage of ATM's is common so immediate detection of a lighting deficiency is essential. The presence of excess lighting will aid in maintaining minimum light levels but a total failure of lighting in the region might go undetected.

Figure 2:
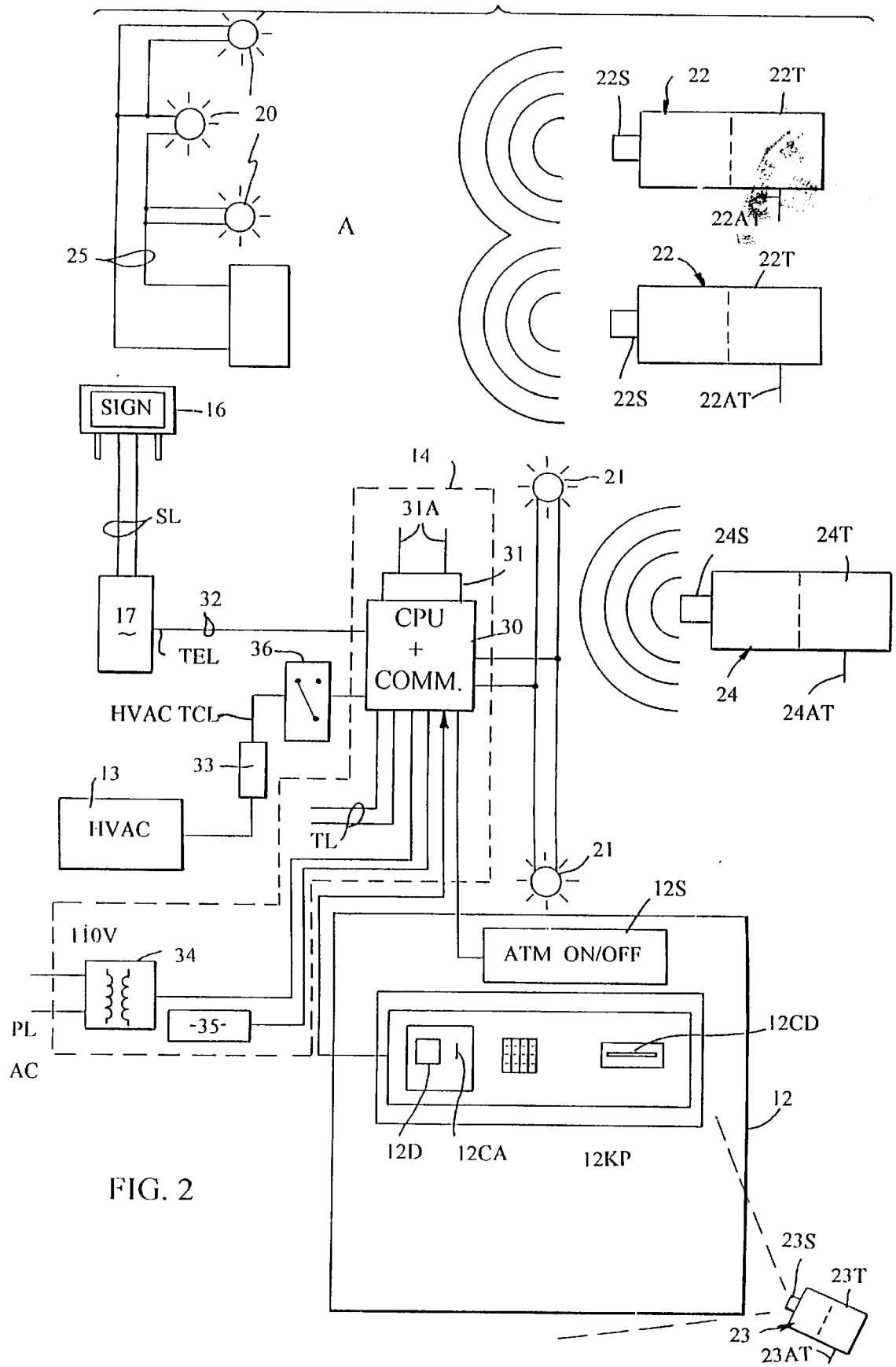
FIG. 2 is a block diagram of a system of this invention.

Employing this system as shown in FIG. 2, the ATM 12 of FIG. 1 is lighted by a number of lamps 20 located so as to provide area lighting such as in parking lot 11 and an additional set of lamps 21 at or incorporated in the ATM 12 to provide immediate area lighting.

One or more area light level sensor assemblies 22, hereinafter referred to as light alert sensors, is positioned on the building 10 where it is exposed to the light from lamps 20, 21. The sensor assemblies 22 include sensors 22S and a wireless transmitter 22T, each transmitter with an internal or external antenna 22AT. The outputs of sensors 22S may also be hard wired, connected through a line carrier driver, or through a multiplex driver to a CPU/communications module 30 in the building 10. Transmitter 22T output or "alarm" signals are received by a receiver 31 having an antenna 31A. Sensor assemblies 22 may be directed such that they do not receive the full illumination from lamps 21, but somewhat less. They may also receive illumination from lamps 20. Often lamps 20 must be located on the exterior bank walls since there is no suitable place to mount them in the adjacent parking lot 11. In such case, the building mounted sensors are adjusted to respond to a minimum light level which is empirically determined to reflect adequate light levels in the parking lot. Thus, if a minimum light level of 2 candle power is required at a particular distance in the parking lot 11 from the ATM 12, it may be determined that a value of 6 candle power sensed on the building at a sensor assembly 22, for example, results in an illumination of 2 candle power at the desired location in parking lot 11. Any sensed light values at a sensor assembly 22 which are below 6 candle power for a given time period would result in sensor assembly 22 transmitting a wireless signal indicating inadequate lighting.

The number and location of lamps 21 is designed to provide the minimum light level at the ATM 12 of 10-candle power.

Located within the room 14 or at other convenient location within the building 10 is the CPU/communications module 30 which may include a wireless receiver 31 or other receiver which receives data from the transmitters 22T as well as other sensors and components of this system as described below.

Additional area sensor assemblies 22 are located exterior to the building 10 to observe the light level at other locations, such as around a corner of the building. All such sensor assemblies 22 operate as described above. A particular site may have several sensor assemblies 22 each separately calibrated to respond to reductions in illumination below a desired level. The receiver 31 or the CPU/communications module 30 is programmed to expect to receive a coded "check-in" signal at frequent intervals from each of sensor assemblies 22 in order to assure the system that all sensors, which include internal timing circuits, are operative. In the normal course, all lamps should work properly and the sensors would not have occasion to transmit a "low light" signal for extensive periods of time. If all the "check-in" signals are not received, it indicates that one or more of sensor assemblies 22 is malfunctioning and the computer will then report to a manned station or take such other action as it is programmed to take.

The sign 16 shown in FIGS. 1 and 2 is powered via sign lines SL and interfacing relay 17 over a time clock controlled power line TEL from the module 30 within the room 14. A current sensor 32 may be coupled to the sign power line TEL to monitor sign lamp current. If the current drops or stops during time clock controlled lighted periods, a sign light failure is detected and registered. Sign lighting failure is not normally related to customer safety and therefore can be reported as an abnormality, which should be remedied at the next workday. Any excess current draw may indicate a short circuit and the sensor 32 will then provide a signal which is interpreted at the CPU/communications module 30 as a dangerous condition and causes an override of the time clock to remove power to the sign 16.

The HVAC units 13 are primarily controlled by their respective thermostats such as thermostat 33 which is located inside of the building 10 of FIG. 1 to sense the temperature in the zone served by the particular unit 13. As in a typical commercial installation, power to the HVAC units 13 is controlled by the thermostat 33 and an interfacing relay 36 which is controlled by a time clock via line HVAC TCL. In accordance with this invention, the line HVAC TCL terminates in the module 30 where its time clock is located. In accordance with this invention, the timing circuit of the CPU portion of the module 30 is used, thereby eliminating the need for numerous time clocks as in the usual commercial installation. In the event that a primary power outage is detected by module 30, backup power is utilized to maintain proper timing in the system. This is in contrast with the typical commercial installation in which a power outage requires a manual resetting of all time clocks.

Figure 3:
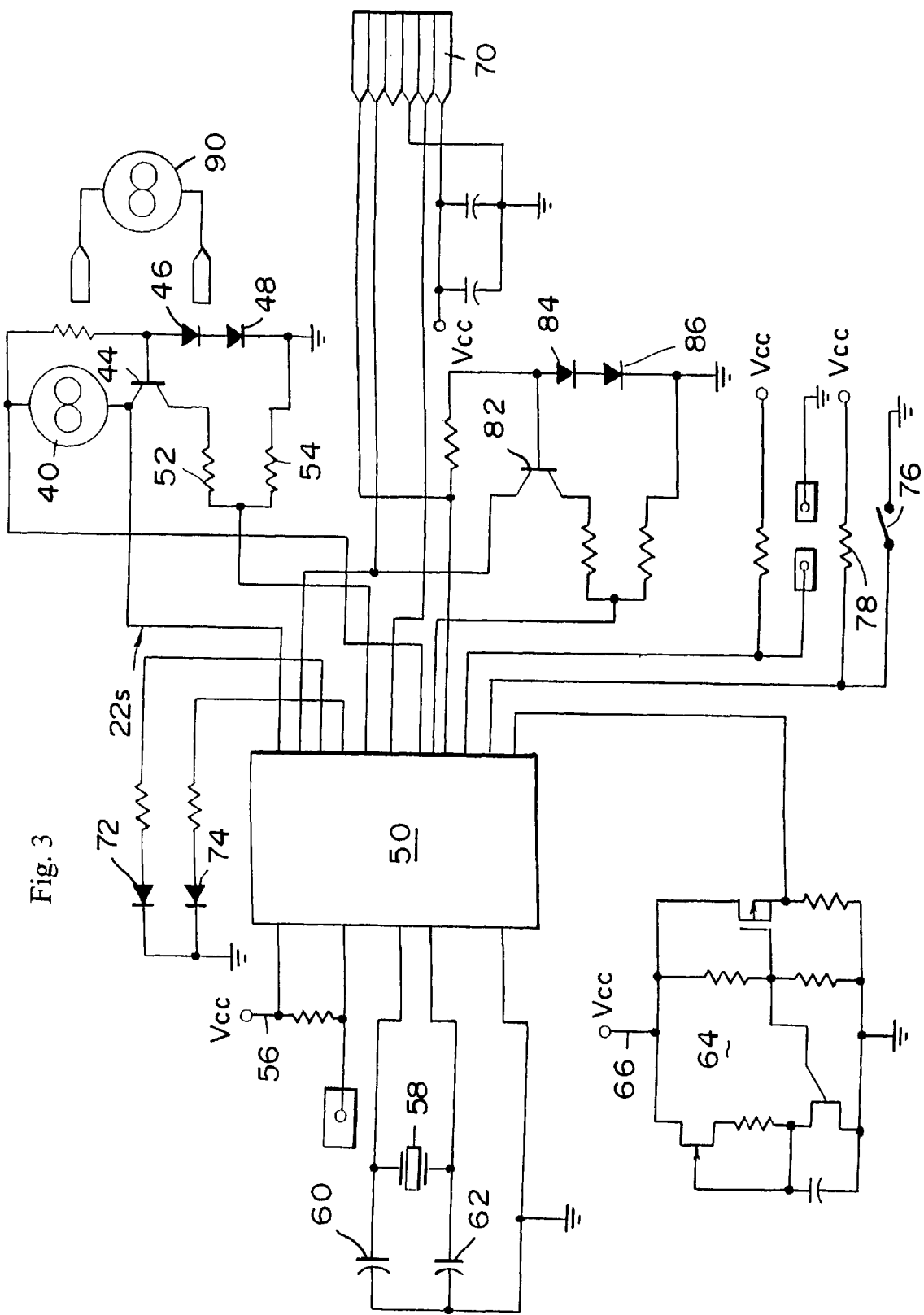
FIG. 3 is a schematic circuit diagram of the light sensor and alerting device of FIG. 2.

Referring again to FIG. 2 in connection with FIG. 3, the ATM 12 which is typically built into an exterior wall of a branch bank building 10 includes a display 12D, card acceptor 12CA, keypad 12KP and a currency dispenser 12CD. Sometimes the ATM will include an illuminated sign 12S to indicate whether the ATM is open or not. Other ATM's have mechanical covers for the display, keyboard and card acceptor to prevent the use of the ATM during certain hours or under certain conditions.

This system is ideal for those systems employing an illuminated sign 12S, which indicates whether the ATM is open, or not. An additional sensor assembly 23, also a light alert sensor, may monitor the light level at the ATM 12 provided by lamps 21 and is operative, when ambient light falls below the prescribed minimum at the ATM, to communicate with the module 30 to disable the ATM and illuminate the ATM CLOSED sign. Depending upon the selection by the bank management, the ATM 12 may be closed when any one of the sensor assemblies 22 of FIG. 2 detects a light level in the general area below the accepted minimum.

Again referring to FIG. 2, the module 30 is powered over the building 10 lines PL after voltage reduction to a suitable operating voltage such as 16.5 v. AC by transformer 34 and a suitable inverter(unshown) to provide DC power where required by the system. A backup or standby battery 35 is likewise provided in the room 14 which is indicated in FIG. 2 by the dashed line surrounding the equipment which is normally located within that room when using the system of this invention.

An additional sensor shown on FIG. 2 is day/night sensor unit 24 which includes a photocell 40 and microcomputer 50 as described below in connection with FIGS. 3–5A.

FIG. 3 is a schematic drawing of the light alert sensors 22S, 23S and day/night sensor 24S which differ basically in their programming. Light alert sensors 22S and 23S are programmed to carry out the functions of FIGS. 7 and 7A while the day/night sensor 24S is programmed to carry out the functions of FIGS. 5 and 5A. The sensor is battery powered and designed to draw a minimum of current since it is intended to perform for years without the need to replace a battery (not shown).

Sensor assemblies 22 each include sensors 22S, the assembly 22 in most cases being mounted on the side of a building. Sensor 22S is housed with a wireless transmitter 22T including an antenna 22AT. Sensor assemblies 23 are identical but positioned to sense the light level immediately adjacent the ATM 12 and include sensor 23S, transmitter 23T and antenna 23AT. Sensors 22S are located where it is exposed to illumination from lamps 20 and/or 21 which are turned on and off by CPU/communications module 30 which receives as one of its inputs, signals from receiver 31 which includes an antenna 31A receiving signals from transmitters 22T and antenna 22AT. Module 30 may receive inputs from a number of other sources, so the transmitted signal from transmitter 22T may be coded to identify both the source and also the action to be taken such as to turn on the lamps 20, turn off the lamps 20, or that there is a failure of illumination from lamps 20, 21 and that some corrective action is to be taken.

The sensors 22 and 23 also send out identification or "check in" signals at regular intervals which are received by the receiver 31 or module 30 which is programmed to expect them at the scheduled intervals. If such "check in" signals are not received when expected, it indicates a malfunction of a sensor assembly 22 or 23 or transmitter 22T or 23T and will cause module 30 to send a message via telephone lines TL (FIG. 2) or by other communication link to a manned station (not shown) that such malfunction has occurred. Alternatively, module 30 could send a signal to close the ATM 12, switch sign 12S to "off" and turn on sign 16 indicating that the ATM 12 is closed.

Light Alert Sensors

Applicants have provided a wireless receiver 31 which is designed to receive input signals from a plurality of sensor assemblies 22 in addition to a larger number of keychain transmitters and panic button transmitters. The receiver 31 monitors the alarm, battery and supervisory status of transmitters 22T and 23T, coded identities of which are learned into or programmed into the several zones of the receiver. When an alarm signal is received from a programmed transmitter, the corresponding zone output switches to the alarm state which is recognized by the module 30 and which then takes some desired action such as alerting a manned station or shutting the ATM 12 down.

The sensors 22S and 23S each include a controller unit 40 which is connected into the collector circuit of a transistor 44. The base circuit of transistor 44 provides a constant current source and includes a pair of diodes 46, 48 which also provide temperature compensation. The collector circuit is connected to a terminal of a microcomputer 50 through a voltage divider circuit including resistors 52 and 54. A second photocell controller 90, may also be connected to microcomputer 50 through six pin header 70 to an identical circuit including a transistor 82 and diodes 84 and 86. The particular microprocessor used in this system is from Microchip Technology, Inc. of 2355 West Chandler Blvd., Chandler, Ariz. 85224-6199 and designated PIC16C711.

The dual range of response for the photocell 12 is provided by resistors 52 and 54. This enables the controller unit 40 to provide an expanded range of 0.5 to 500 foot candles. The microprocessors, in sensing a large number of light samples, then arrives at an average foot candle value. If this average value is above a certain threshold such as 5 foot candles, it will remain in high range. Should the average be below the threshold value, the microprocessor will switch the midpoint between resistors 52 and 54 to ground, thus effectively removing resistor 54 from the circuit. This effectively sets up the lower range which will sample light values from, for example, 5 foot candles down to 0.5 foot candles.

Once sensor 22S is powered up, it begins calibration light sampling and samples with a high range input reference to see if the light is equal to or above the reference. If so, this value is stored. If not, the sensed light is compared with the low range value and the low range value is stored. With high and low range values stored, the computer will then calculate and store an alarm value based on a percentage of a previous stored value for high and low light values. It will also calculate and store a restore or restoration value based on a somewhat higher percentage of the previously stored values for high and low light values. Thus if a high range value is 20 foot candles, for example, the system may calculate and store a restoration value (the value at which it ceases to send an alarm signal) of 16 foot candles.

This completes an initial calibration mode and the system then switches to "run" mode and begins with initial samples on both high and low ranges. If neither sample is below the stored alarm point, the system continues sampling. If either is below the stored alarm point, the event is stored in the alarm counter and the system continues sampling light samples. If enough samples below the stored alarm point are counted to fill the alarm counter, the alarm is switched and the alarm counter reset, after which another light sample is taken and compared with high and low restoration values. If not, further samples are taken. If light samples come in above the restoration value, a restore event is added to the restore counter. When the restore counter is full, the alarm output is normalized (shut off) and the restore counter is reset.

The power supply for the sensors 22S and 23S is from an externally located battery providing 3.6 volts. Connections to this battery are identified by VCC. Sensors 22S are, or may be, connected to or located in the same housing with a wireless transmitter 22T or 23T containing the battery. A battery terminal VCC is shown at numeral 56 connected to the microcomputer 50. Connected across the microprocessor clock terminals is a crystal 58 whose terminals are also connected to ground through capacitors 60 and 62.

An oscillator circuit 64 is also connected to the microcomputer 50 and it is connected to the battery power source at terminal 66. It is the primary function of the oscillator circuit 64 to trigger or "wake up" the microprocessor every 20 seconds to cause it to sample and record a light reading from the photocell. In this manner the microcomputer 50 remains quiescent (in a sleep mode), except for its clock, over a major part of the 20-second cycle thus reducing its power consumption to a very low value (1 microamp) consistent with a 10+ year life of the battery. In run mode, the microcomputer 50 responds to a pulse from the oscillator circuit 64 to receive an input from the controller unit 40 and take a reading as to the light value sensed. It then makes whatever comparison or evaluation is called for by its program. It may simply add a count, or call for a delay in accepting photocell inputs, or if it reaches a specified count, it sends an output signal to the "ALARM" terminal of a 6-pin header 70 which becomes an input to the transmitter 22T which transmits a signal to receiver 31. While in run mode the microprocessor will consume approximately 50 microamps which occurs for 5 milliseconds every 20 seconds which averages 1–2 microamps continuously. Where there is no need to severely limit power consumption such as where sensors 22S is hard wired to a light controller, no such oscillator would be required.

Day/night Sensors

Although photocells provide the most predictable properties for lighting on/off purposes, they have the disadvantage that photocells have a wide tolerance from cell to cell which may be as great as ±33%. Therefore, photocell manufacturers have to make sure that the most sensitive photocells do not turn lights on too early or turn them off too late. As a consequence, the least sensitive photocells turn lights off too late in the morning and on too early in the evening, which wastes valuable electricity and lowers the mean time before failure of light bulbs and fixtures.

Figure 4:
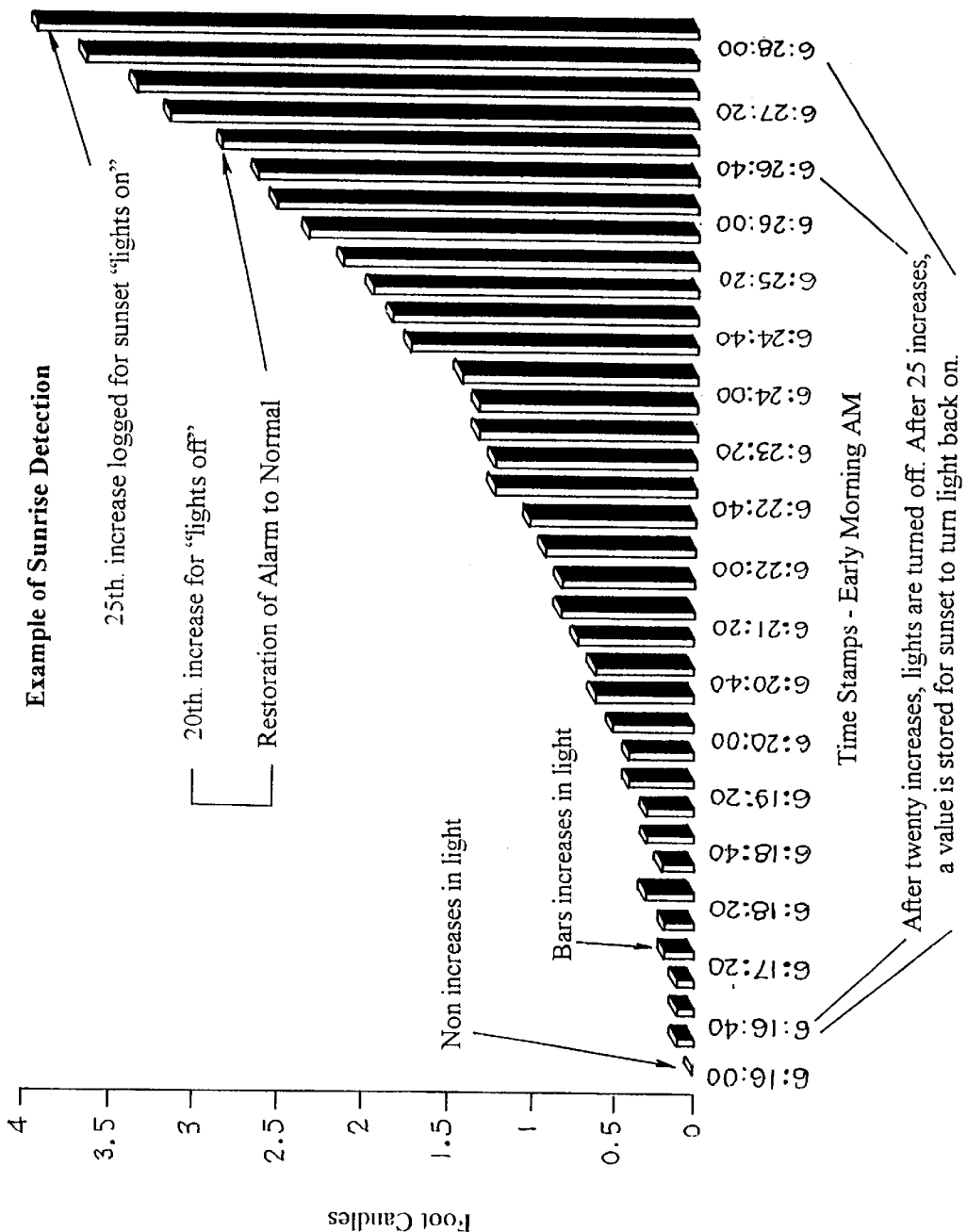
FIG. 4 is a graph showing a pattern of light increases in the morning which result in causing the microcomputer controlled photocell to produce signals for "lights on" or "lights off"

FIG. 4 is a graph plotting foot-candles vs. time as sunrise proceeds on a typical day. The day/night sensor 24S takes samples of light every 20 seconds for eighty minutes after dark to establish a "night" reference which is basically the only constant. The system will continue to sample the ambient light every 20 seconds to see if there is a change. As shown on the graph, no change is shown until 6:16:40 at which time there is a sensed increase in light. At 6:17:20, there is another increase. At 6:17:40 there is no increase. Another increase is seen at 6:18:00. No increase then is sensed until 6:19:20. Other increases are seen at 6:21:00 and 6:21:20 and 6:21:40. The periods of no increase keep diminishing until beginning at 6:24:00 there is a steady series of increases to 6:26:40 at which point the microcomputer has registered twenty increases. The light value at approximately 2.9 foot candles is registered as a light value for "lights off". At this point, the microcomputer 50 produces a "restore to normal" output which is transmitted to the receiver 31 and CPU/communication module 30 to turn off lamps 20, 21. The microcomputer 50 will continue to sense increasing light values until 6:28:00 at which time it stores a light value at approximately 4.1 foot-candles which is the "sunset detect" value which will be used when the light diminishes at the end of the day to turn the lights back on. The light values will continue to increase and the unit 10 will continue to monitor light values over the "sunset detect" value every 20 seconds for 80 minutes at which time it enables the microcomputer 50 to react to the light values below the "sunset detect" value.

FIGS. 5 and 5A are two parts of a flowchart describing the operation of the sensor 24S. Definitions of terms used in connection with FIGS. 5 and 5A are as follows:

Sunrise Detect Value

A value that when reached (after a period of darkness) will switch off the lighting connected to the microcomputer controlled photocell unit. It is stored everyday after a preset amount of light increases has been accumulated after a preset time of darkness.

Sundown Detect Value

This is a value that is stored everyday after a preset amount of increases have been accumulated after a preset time of darkness. This value is usually higher than the sunset detect value, but does not have to be. It is stored everyday after a preset amount of light increases has been accumulated after a preset time of darkness.

Darkness Detect Value

This is a value that is stored in the microcomputer. After sunset has been detected and lights are switched on, the microcomputer looks for light samples below this value. When a preset number of samples have been accumulated below this value, a flag is set to tell the microcomputer that it is night time and to start accumulating increases of light of sunrise detection.

Night Reference

This is a value that is sampled and stored during darkness. This will be used as the reference to detect increases in light at sunrise.

Increase Counter

A counter that is used to detect a condition that is stable over a period of time. For example, an increase counter is used to detect sunrise by accumulating increasing values above the night reference value for a programmed number of samples.

Daytime Counter

A counter that is used to detect that it is now daytime. This is accomplished by detecting a programmed number of light values that are above the sunset detect value.

No Increase Counter

A counter that is used to detect "no change" condition. For example when an increase of light occurs in the middle of the night (a lightning flash for instance) an increase in light will be detected. If upon the next sample, there is no more increase, a counter will keep track of consecutive "no increase" values and when the total reaches a programmed value (such as ten times) the sunrise increase counter will be reset to 0 and start over. This eliminates short term increases in light from accumulating in the increase counter.

When the power is applied, three arbitrary default values are loaded into the system, a "sunrise detect" value, a "sundown detect" value and a "darkness detect" value. The microcomputer 50 will check sensed light values to determine if they are below "sunset detect" value and, if so, an alarm output will request that the lamps 20, 21 be turned on. If not, the system will continue to sample the light until it sees samples that are below "sunset detect" value at which time it turns the lights on. If further samples show that light is below "sunset detect" the system will wait for a period such as two hours to assure darkness and then will take a predetermined number of samples to be sure it is night. Further light samples are then taken which are compared with the previous increased value. If there are no such increases, counts are added to a "no increase" counter which is then checked to see if this counter exceeds its limits. If it does, the counter is reset to zero and the "night reference" is reset to the current detected value.

If there are increases above the previous increased sample value each such increased readings add to the "increase counter."

If the increase counter is above the sunrise counter value, the microcomputer will send a "restore to normal" alarm signal to turn off lamps 20, 21 and further samples are taken to arrive at "sundown detect" value which is stored until the end of the day as described above, but the system continues to take light samples.

Referring back to the initial check for "sunset detect" value, if the light values sampled are below such value further samples are taken checking for increases in light. If no increases are sensed, counts are added to the "no increase" counter. When the limit of this counter is reached, the "increase" and "no increase" counter are reset to zero and the "night reference" is reset to the current detected value after which the microcomputer 50 continues taking samples of light. If in checking for increases in light, such increases are found, each sample will add one to the "increase counter." This counter is checked to see if above the sunset count value, this "sunset detect" value is logged into the system and further light samples are taken. When light values reach 25% above the logged "sunset detect" value, counts are added to the daytime counter. If the daytime counter is not above its programmed value, further samples of light are taken. If the "daytime counter" is above its programmed value, then the microcomputer checks for light values below the "sunset detect" value.

FIG. 6 is a graph plotting foot-candles vs. elapsed time over a typical day. From a night reference which is assumed to be dark, the system sees no or very little light and no steady increase in light until just before 6:00 a.m. when the sensed increase occurs over sufficient number of light samples to send a "lights off" signal. With further increases in light a new light value is sensed and stored for the "sunset detect" signal. The foot candle readings then increase substantially and maintain a high value through most of the day. After 80 minutes of sensed light values above the "sunset detect" value, the microcomputer is armed to look for the "sunset detect" value again. As the light diminishes late in the day, the sunset detect value is reached and an output signal is transmitted to turn on the lights. After 80 minutes of dark, the sensor takes light sample of ambient light to store as a "night reference". This reference is maintained until the sensor again detects a series of sample of increasing light values and transmits a "lights off" signal.

The sensor unit 24 constitutes a day/night sensor and is connected, through wireless or other communication link, with a particular zone of the receiver 31 which among other things, has the function of by-passing all other zones during the daytime. The functions of sensor 24S are set forth on the flow chart, FIGS. 5 and 5A. When first installed, the day/night sensor 24S doesn't "know" whether it is day or night. On power up, the sensor loads the default value for Darkness Detect, Sundown Detect, and Sunrise Detect. The installer simply places a magnet over a reed switch 76 for a predetermined period, e.g., 10 seconds, which connects the battery voltage to ground through a resistor 78. This causes a signal to microcomputer 50 to sample listed level and compare the darkness default value. If above darkness detect a green LED 74 to illuminate for one second and then go to run mode and look for sundown detect value. If below darkness detect value, the red LED 72 is illuminated for one second and then goes to run mode and looks for sunrise detect scenario.

AUTOMATIC BYPASSING FUNCTION OF SYSTEM

Night Mode

In night mode, i.e., the day night sensor tells the receiver that it is dark, the receiver enables all other zones to receive inputs from the sensors 22 and 23. During the sensed daylight period the receiver responds to the day/night sensor 24 by causing the other zones to be ignored or by-pass any inputs from the sensors 22 and 23 including the alarm signals indicating a failure of a sensor 22 or 23 to "check in" at the established intervals. There is also a "low battery" alarm signal from sensors 22 and 23 which is also ignored during the daytime. Once the receiver is told to cease by-passing the alarm signals from sensors 22 and 23, these alarm outputs result in inputs to the CPU/communication unit 30 to take some corrective action. When sensor 24 responds to the nighttime sensed value, it normally waits for a set time before unby-passing sensor 22 and 23 signal, and may, of course cause module 30 to turn on building lights or take any further action.

When dawn arrives, the day/night sensor 24 will sense an increasing number of light samples above the alarm value and above the "restore" value. When the restore counter is full, it is decided that day has arrived and an output is sent to the receiver 31 to turn off the building lights and to again tell all the receiver zones receiving inputs from sensors 22 and 23 to by pass those inputs for daytime operation. This is to restrict the sensors 22 and 23 from initiating alarms between dawn and dusk.

The module 30 of FIG. 2 may include a controller unit of the type employed in security systems such as the Ranger 9000E Downloadable Control Communicator of Caddx-Caddi Controls, Inc. of Gladewater, Tex. This type of controller provides as many as 16 sensor inputs, 16 programmable outputs, 8 relay outputs, a basic 16-key keypad or a full English language keypad and a printer output. This unit may be used as the basic controller for the system or as alternatives, a separate CPU may be present or a personal computer may be used, relying upon the downloadable control communicator only for its multi inputs and outputs and to a degree its programmable features. When a personal computer is used it should have, at least, the following:

IBM PC or compatible, XT or AT or higher

640K RAM, DOS 3.1 or higher, hard drive recommended

A full keyboard, a monitor and a printer are used to complete the personal computer system.

The communicator portion of module 30 includes a data modem for the communication of information over telephone lines TL to a central monitoring office. Such office may be at a security company location or at a police station if the system incorporates security monitoring as well such as entrance protection or motion detection during closed hours.

The operating hours of the system may be controlled by the computer clock which receives signals from the day/night sensor described above to turn the outside lights of the building on and off at specific times.

The computer clock is also scheduled to operate any of several relays to provide timed operation of any of several functions in the building 10 such as:

(a) sign lighting current too low;
(b) heating/air conditioning system operation outside of standards;
(c) lighting control;
(d) water leakage detection;
(e) employee panic alarm operation; and
(f) courier panic alarm operation.

The computer program is the DL900 Ranger Upload/Download Program, Ver. 3.76 of Caddx-Caddi Controls, Inc. of Gladewater, Tex. 75647 which accompanies their RANGER Model 9000E Downloadable Control/Communicator.

The above-described embodiments of the present invention are merely descriptive of its principles and are not to be considered limiting. The scope of the present invention instead shall be determined from the scope of the following claims including their equivalents.

We claim:

1. A system for monitoring and responding to light levels below a predetermined level established by lights on or adjacent to a business installation to insure adequate consumer light level protection comprising:

light sensing means for sensing the light levels in the immediate area of said installation, said light sensing means including a photocell, a microcomputer having a clock connected to said photocell taking very short time samples of the photocell output and converting said samples into digital light value signals varying with said photocell outputs;

program means causing said microcomputer to:
  a) establish a predetermined "darkness detect" light value;
  b) respond to a predetermined number of light value samples showing a progressive increase in light values to produce a signal to turn said lights off;
  c) respond to another predetermined number of light value samples showing a progressive increase in light values to produce a sunset detect light value reference;
  d) following a predetermined time period to respond to the occurrence of a light value corresponding to the sunset detect light value reference to produce a signal to turn said lights on;
  e) following a set time period after said lights on signal to sample light values to establish a night reference light value;
  f) beginning with step b) repeating the above steps;

a receiver receiving said lights off and lights on signals; and means connected to said receiver and responsive to said lights on and lights off signals to produce output signals to turn said lights off and to turn said lights on.

2. A system as claimed in claim 1 further including a plurality of said light sensing means and wherein said receiver includes a plurality of zones for receiving output signals from said plurality of light sensing means.

3. A system as claimed in claim 1 wherein said light sensing means is further programmed to send an identification signal to said receiver at regular intervals.

4. A system as claimed in claim 3 wherein said receiver includes means programmed to receive said identification signal at said regular intervals and operative in response to a failure to receive said identification signal to provide a signal to said means responsive to alarm signals to take a desired corrective action.

5. A system as claimed in claim 1 wherein additional photocell means also includes a microcomputer having an alarm counter which stores a value corresponding to a specific light level, which samples light values and which responds to sample light values below the stored light value to add counts to said alarm counter, said alarm counter responding to a full count in said counter to create an alarm output and to reset said alarm counter;

said microcomputer also includes a restore counter which stores a restore value corresponding to a light level greater than said alarm counter light level, which samples light values and responds to sample values above said restore value to add counts to said restore counter, said restore counter responding to a full count therein to produce an output to normalize said alarm output and reset said restore counter;

said restore counter output causing said receiver to by pass said lights off and light on signals; and said alarm output producing a signal which, after a predetermined time period, enables said receiver to receive said lights on and lights off signals.

6. A system as claimed in claim 1 wherein said light level sensing means further includes a battery and a wireless transmitter and said receiver is a wireless receiver.

7. A system as claimed in claim 6 wherein said light level sensing means includes an oscillator connected to said microcomputer, said oscillator having a much lower frequency than said microcomputer such that said microcomputer is maintained in a substantially quiescent state over the greater part of each oscillator cycle.

8. A system for monitoring and responding to light levels adjacent an automatic teller machine to insure adequate light levels comprising light sensing means producing output signals varying with light levels sensed;

computer means sampling said output signals over a predetermined period at night to produce a night reference value, further sampling said output signals and responsive to a predetermined number of signals representing increasing light values above said night reference value to provide a lights off signal, further sampling said output signals and responsive to further increases in sensed light values to provide and retain an evening turn on light value reference, further sampling said output signals until said evening turn on light value is sensed and providing a signal to turn said lights on, and further sampling said output signals for a predetermined period to establish a night reference light value;

a transmitter transmitting said output signals;

a receiver receiving said output signals; and means responsive to said received lights on and lights off signals for turning said lights on and off and responsive to said alarm output signal to initiate a desired corrective action.

9. A system as claimed in claim 8 wherein said light level sensing means further includes a battery and a wireless transmitter and said receiver is a wireless receiver.

10. A system as claimed in claim 8 further including a plurality of said light sensing means and wherein said receiver includes a plurality of zones for receiving output signals from said plurality of light sensing means.

11. A system as claimed in claim 8 wherein said system is further programmed to send an identification signal to said receiver at regular intervals.

12. A system as claimed in claim 10 wherein said receiver includes means programmed to receive said identification signal at said regular intervals and operative in response to a failure to receive said identification signal to provide a signal to said means responsive to alarm signals to take a desired corrective action.

13. A system for monitoring and responding to light levels below a predetermined level established by lights on or adjacent to a business installation to insure adequate consumer light level protection comprising:

said light sensing means including a microcomputer controlled photocell for sampling said sensed light levels over a period of time to determine a night reference light value, for further sampling said light values and to respond to a specified number of light value increases to provide a signal to turn said lights off, for further sampling increasing light values to establish an evening turn on light value reference, for further sampling said light values until said evening turn on light value is sensed to provide a signal to turn said lights on; and means responsive to said signals for turning said lights on and off.

14. A system as claimed in claim 12 in which said signal responsive means includes a CPU/communication module including a clock.

15. A system as claimed in claim 13 wherein said light sensing means further includes a wireless transmitter and a wireless receiver is connected to said CPU/communication module.

16. A system as claimed in claim 14 wherein said wireless transmitter further includes means transmitting an identification signal to said receiving means at regular intervals.

17. A system as claimed in claim 15 wherein said CPU/communications module includes means programmed to receive said identification signal on a timed basis and operative in response to failure to receive said identification signal to take a desired corrective action.

* * * * *